(12) United States Patent
Eguchi

(10) Patent No.: US 8,242,636 B2
(45) Date of Patent: Aug. 14, 2012

(54) CONNECTION APPARATUS FOR PARALLEL RUNNING GENERATORS

(75) Inventor: Junichi Eguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 83 days.

(21) Appl. No.: 12/489,027

(22) Filed: Jun. 22, 2009

(65) Prior Publication Data

US 2009/0315405 A1    Dec. 24, 2009

(30) Foreign Application Priority Data

Jun. 24, 2008  (JP) .................................. 2008-164372

(51) Int. Cl.
| | |
|---|---|
| H02P 1/04 | (2006.01) |
| H02P 1/10 | (2006.01) |
| H02P 1/54 | (2006.01) |
| H02P 1/58 | (2006.01) |

(52) U.S. Cl. .......................................... 307/84; 307/85
(58) Field of Classification Search ................ 307/84–85
See application file for complete search history.

(56) References Cited

U.S. PATENT DOCUMENTS

| | | | | |
|---|---|---|---|---|
| 4,321,645 | A  * | 3/1982  | Thom et al. ................... | 361/63 |
| 4,992,904 | A  * | 2/1991  | Spencer et al. ................ | 361/5 |
| 6,055,163 | A  * | 4/2000  | Wagner et al. ................. | 363/37 |
| 6,297,977 | B1 * | 10/2001 | Huggett et al. ................ | 363/65 |
| 6,727,603 | B1 * | 4/2004  | McConnell et al. ........... | 307/64 |
| 6,813,353 | B1 * | 11/2004 | Robinson et al. ............. | 379/418 |
| 7,078,825 | B2 * | 7/2006  | Ebrahim et al. ............... | 290/52 |
| 7,122,916 | B2 * | 10/2006 | Nguyen et al. ................. | 307/57 |
| 7,168,531 | B2 * | 1/2007  | Navarro ....................... | 188/112 R |
| 7,514,813 | B2 * | 4/2009  | McKelvey et al. ............. | 307/32 |
| 7,667,341 | B2 * | 2/2010  | Serdynski et al. ........... | 290/30 A |
| 7,679,219 | B2 * | 3/2010  | Labitzke et al. ............... | 307/84 |
| 7,816,813 | B2 * | 10/2010 | Yagudayev et al. ........... | 307/64 |
| 2004/0046458 | A1 * | 3/2004  | MacKay ....................... | 307/80 |

(Continued)

FOREIGN PATENT DOCUMENTS

JP  05-103421   4/1993

(Continued)

OTHER PUBLICATIONS

Japanese Office Action from Japanese App. No. 2008-164372 dated on Feb. 22, 2012.

*Primary Examiner* — Adi Amrany
(74) *Attorney, Agent, or Firm* — Arent Fox LLP

(57) ABSTRACT

In an apparatus for connecting two generators to an electrical load, there are provided a first group of terminals that are adapted to be connected to a single remote controller provided independently and separately from the apparatus and provided with a start switch and a stop switch to be manipulated by an operator, a second group of terminals that are adapted to be connected to each remote control terminal of the generators, and an electronic control unit that is connected to the first and second group of terminals and starts/stops each of the generators by outputting signals to each of the generators through the second group of terminals in accordance with a start instruction signal and a stop instruction signal produced in response to the operator's manipulation of the start switch and stop switch and inputted through the first group of terminals, thereby enabling to start and stop generators to be run in parallel by using a single remote controller.

5 Claims, 4 Drawing Sheets

U.S. PATENT DOCUMENTS

| | | | | |
|---|---|---|---|---|
| 2004/0231831 A1* | 11/2004 | Houck et al. | ............. | 165/202 |
| 2005/0016713 A1* | 1/2005 | Houck et al. | ............. | 165/42 |
| 2005/0082386 A1* | 4/2005 | Navarro | ............. | 239/172 |
| 2006/0108988 A1* | 5/2006 | McKelvey et al. | ............. | 323/205 |
| 2009/0319089 A1* | 12/2009 | Eguchi et al. | ............. | 700/286 |

FOREIGN PATENT DOCUMENTS

| | | |
|---|---|---|
| JP | 2869905 B2 | 1/1999 |
| JP | 2000-116195 A | 4/2000 |

\* cited by examiner

REMOTE CONTROLLER
START SWITCH ON

INSTRUCTION TO START
GENERATOR B

GENERATOR B STARTED

INSTRUCTION TO START
GENERATOR A

GENERATOR A STARTED

REMOTE CONTROLLER
STOP SWITCH ON

INSTRUCTION TO STOP
GENERATOR A

GENERATOR A
STOPPED

INSTRUCTION TO STOP
GENERATOR B

GENERATOR B
STOPPED

CONNECTION APPARATUS FOR PARALLEL RUNNING GENERATORS

BACKGROUND OF THE INVENTION

1. Field of the Invention

This invention relates to a connection apparatus for parallel running generators, particularly to an apparatus for connecting generators to run in parallel.

2. Description of the Related Art

There is known an apparatus for connecting a plurality of, e.g. two, generators (which are driven by an internal combustion engine) to run in parallel, as taught by Japanese Patent No. 2,869,905. The conventional technique is configured so that, in the case where a plug is disconnected from the associated socket, an output voltage does not appear at the terminals of the disconnected plug.

SUMMARY OF THE INVENTION

Since a generator driven by an engine makes a loud noise, the generator is often installed in the basement and controlled by sending start/stop commands from the first floor through a remote controller. In this case, when two generators to be run or operated in parallel are remote-controlled, they are connected by the connection apparatus and the remote controllers has to be separately provided for the respective generators. However, in such an arrangement of the generators to be run in parallel, provision of the remote controllers separately or individually makes the structure and manipulation complicated, disadvantageously.

An object of this invention is therefore to overcome the foregoing problem by providing a connection apparatus for parallel running generators which can start and stop multiple interconnected generators to be run in parallel by using a single remote controller.

In order to achieve the object, this invention provides an apparatus for connecting generators to an electrical load through a conductive path to run in parallel, comprising: a first group of terminals that are adapted to be connected to a single remote controller provided independently and separately from the apparatus and provided with a start switch and a stop switch to be manipulated by an operator; a second group of terminals that are adapted to be connected to each remote control terminal of the generators; and an electronic control unit that is connected to the first and second group of terminals and starts/stops each of the generators by outputting signals to each of the generators through the second group of terminals in accordance with a start instruction signal and a stop instruction signal produced in response to the operator's manipulation of the start switch and stop switch and inputted through the first group of terminals.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

Figure 1:
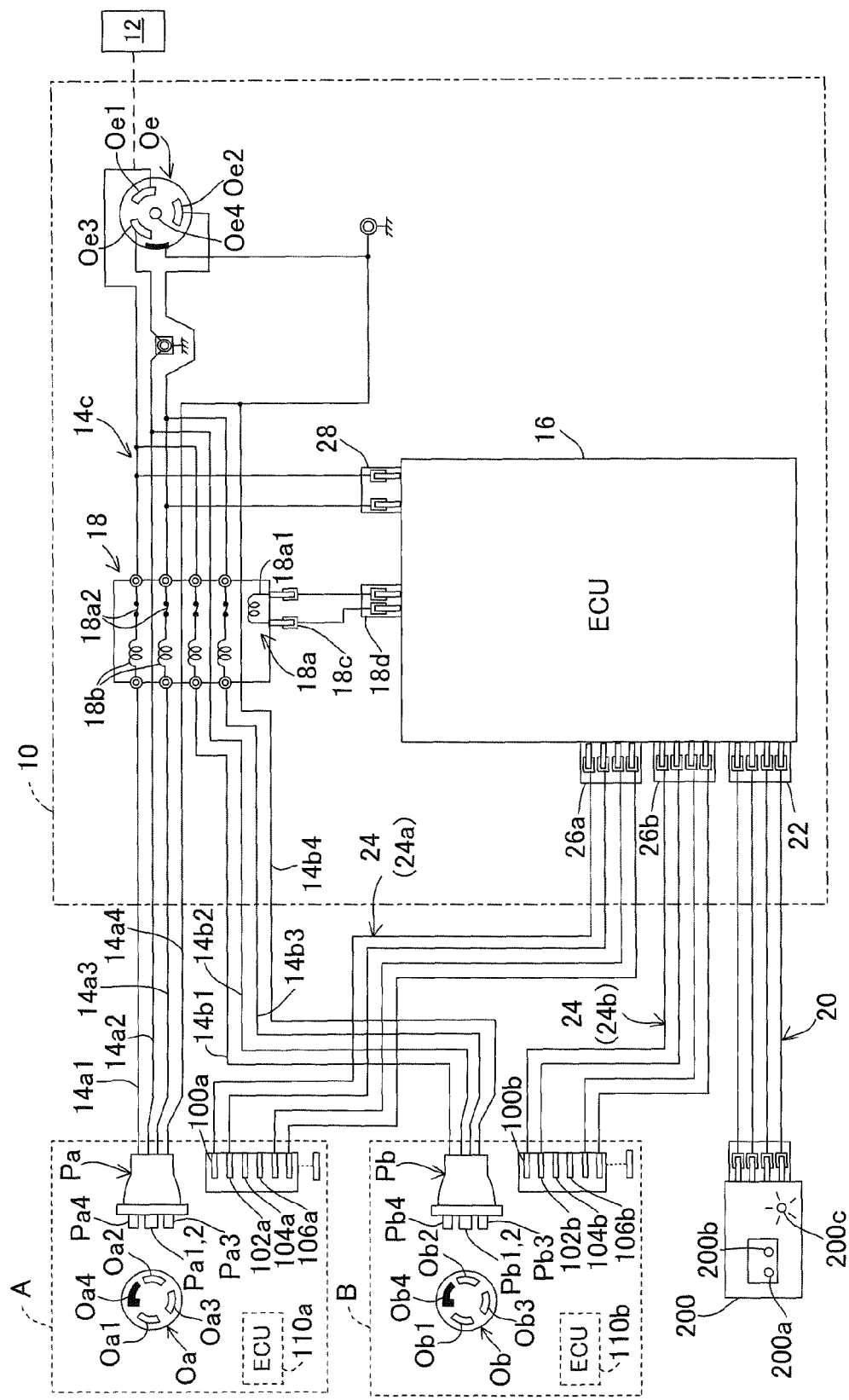
FIG. 1 is a block diagram giving an overview of a connection apparatus for parallel running generators according to an embodiment of this invention.

FIG. 1 is a block diagram giving an overview of a connection apparatus for parallel running generators according to an embodiment of this invention.

As illustrated, the connection apparatus (designated by reference numeral 10) is an apparatus for connecting a plurality of generators (two generators A and B in the illustrated configuration) for parallel running. The generators A and B are both driven by internal combustion engines started using recoil starters (or cell starter). The generators A and B are identical model units that, for example, produce single-phase alternating current outputs of around 4.5 kVA at 100 V/200 V.

The generators A and B are equipped with output sockets Oa and Ob for outputting power. The output socket Oa (Ob) is equipped with a single-phase, three-wire structure constituted of voltage terminals Oa1 and Oa2 (Ob1 and Ob2), and a neutral terminal Oa3 (Ob3) therebetween, plus a ground terminal Oa4 (Ob4).

The apparatus 10 is equipped with at least two plugs Pa and Pb connectable with the output sockets Oa and Ob of the generators A and B, respectively, at least one output socket Oe connectable to an electrical load 12, a conductive path 14 capable of connecting the generators A and B to the electrical load 12, an electronic control unit (ECU) 16 comprising a microcomputer, a switching circuit 18 for opening and closing the conductive path 14, a terminal 22 connected via signal lines 20 with a single remote controller (explained later) that is provided independently and separately from the apparatus and provided to be manipulated by the operator, and two (a plurality of) terminals 26 (26a, 26b) connected via signal lines 24 (24a, 24b) with remote controller connection terminals (explained later) of the generators A, B. The ECU 16 is configured to be connectable to the remote controller through the signal lines 20 and terminal 22 and to ECUs (explained later) of the generators A, B through the signal lines 24 and terminals 26.

The foregoing components are explained below in detail.

The plug Pa (Pb), which is configured complementary to the output socket Oa (Ob) of the generator A (B), is equipped with a single-phase, three-wire structure constituted of voltage terminals Pa1 and Pa2 (Pb1 and Pb2), and a neutral terminal Pa3 (Pb3) therebetween, plus a ground terminal Pa4 (Pb4). The plugs Pa and Pb and the output sockets Oa and Ob of the generators A and B have ordinary conventional structures.

Similarly to the output sockets Oa and Ob on the generator side, the output socket Oe of the apparatus 10 is equipped with a single-phase, three-wire structure constituted of voltage terminals Oe1 and Oe2, and a neutral terminal Oe3 therebetween, plus a ground terminal Oe4. The output socket Oe is connected to the electrical load 12 by inserting the plug (not shown) of the electrical load 12 into output socket Oe.

The conductive path 14 connects the plugs Pa and Pb with the output socket Oe. It is configured to receive the outputs of the generators A and B through the plugs Pa and Pb and send them to the electrical load 12 through the output socket Oe. Specifically, it comprises high-voltage wires 14a1 and 14b1 for interconnecting the voltage terminals on the high-voltage side, low-voltage wires 14a2 and 14b2 for interconnecting the voltage terminals on the low-voltage side, neutral wires 14a3 and 14b3 for interconnecting the neutral terminals, and ground wires 14a4 and 14b4 for interconnecting the ground terminals.

The high voltage wires 14a1 and 14b1, the low-voltage wires 14a2 and 14b2, the neutral wires 14a3 and 14b3, and the ground wires 14a4 and 14b4 are connected (merged) at junctions 14c, whereby the conductive path 14 is from thereon reduced to the high voltage wire 14a1, the low-voltage wire 14a2, the neutral wire 14a3, and the ground wire 14a4, so that the power outputs of the generators A and B are integrated and sent to the socket Oe thereby.

The switching circuit 18 is inserted in the conductive path 14 on the upstream side of the junctions 14c. It is equipped with a relay 18a comprising a coil 18a1 and contacts 18a2 inserted in the high voltage wires 14a1 and 14b1 and the neutral wires 14a3 and 14b3. The contacts 18a2 of the relay 18a are normally closed. They remain closed to send the output of the generators A and B to the output socket Oe so long as the coil 18a1 is demagnetized.

When the coil 18a1 is magnetized, the contacts 18a2 open to open the conductive path 14. As a result, supply of the output of the generators A and B to the output socket Oe is prevented. The contacts 18a2 can also be opened manually. The switching circuit 18 is provided upstream of the contacts 18a2 with coils 18b for detecting over-current. The coil 18a1 of the relay 18a of the switching circuit 18 is connected to the ECU 16 through connectors 18c and 18d.

The small double circles on opposite sides of the switching circuit 18 indicate terminals. A breaker (not shown) installed downstream of the switching circuit 18 opens the conductive path 14 when the electrical load 12 is overloaded owing to electrical leakage or the like.

An operating power generation circuit (not shown) is provided between the high voltage wire 14a1 and neutral wire 14a3 and terminals 28. The operating power generation circuit converts the AC 200 V voltage across the terminals of the high voltage wires 14a1 and 14b1 to 12 V and 5 V direct current for supply to the ECU 16 etc. as operating power.

The aforementioned remote controller is now assigned by reference numeral 200. The controller 200 having a box shape is equipped with a start switch 200a that outputs an instruction signal to the ECUs 110a, 110b of the generators A, B to start the engines, a stop switch 200b that outputs an instruction signal to them to stop the engines, and a pilot lamp (PL) 200c.

The controller 200 has a 12 V battery (not shown) therein. The pilot lamp 200c is connected to the positive side terminal i.e., REM+ terminal of the battery and to the negative side terminal, i.e., PL terminal thereof.

The generators A, B are equipped with several terminals used for connection with the controller 200 and for accessing the troubleshooting facility. The terminals for the remote controller connection are terminals 100a, 100b connected to the REM+ terminal, terminals 102a, 102b connected to the PL terminal, terminals 104a, 104b connected to the start switch 200a for inputting the engine start instruction signal and terminals 106a, 106b connected to the stop switch 200b for inputting the engine stop instruction signal. The generators A, B are also provided with the ECUs (now assigned by 110a, 110b) comprising microcomputers. The suffixes a and b are omitted in the explanation that follows.

Thus, in the apparatus 10, the ECU 16 is connectable to the controller 200 through the signal lines 20 and terminal 22 and connectable to or communicatable with the ECUs 110a, 110b of the generators A, B through the signal lines 24a, 24b and terminals 26a, 26b.

Figure 2:
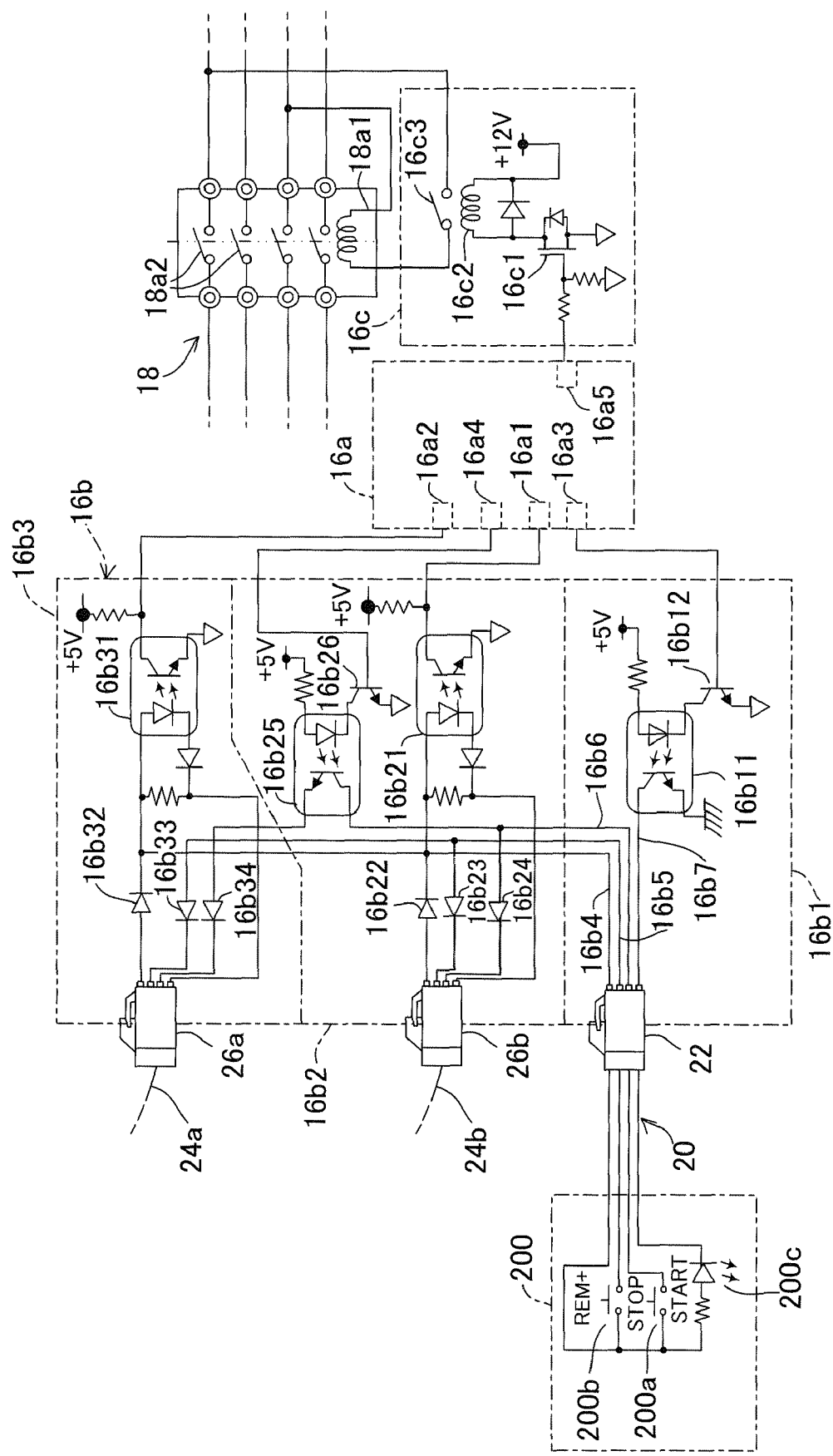
FIG. 2 is a block diagram showing the configuration of an ECU of the apparatus shown in FIG. 1.

FIG. 2 is a block diagram showing the configuration of the ECU 16.

As shown, the ECU 16 is equipped with a CPU 16a, a start/stop instruction unit 16b, and a relay driver 16c.

The CPU 16a is equipped with input ports 16a1, 16a2 and output ports 16a3, 16a4, 16a5.

The start/stop instruction unit 16b includes three instruction sections, specifically, from the bottom in FIG. 2, a first instruction section 16b1, second instruction section 16b2 and third instruction section 16b3.

The REM+ terminal and the like of the controller 200 are connected to the ECU 16 through the terminal 22 and to the first instruction section 16b1 through signal lines 16b4, 16b5, 16b6 and 16b7. The signal lines 16b4, 16b5 and 16b6 connected with the REM+ terminal, stop switch 200b and start switch 200a of the controller 200 are directly connected to the second and third instruction sections 16b2, 16b3.

A signal line 16b7 (connected with the PL terminal) is connected to an insulating photocoupler 16b11, i.e., to the collector terminal of a transistor thereof. The emitter terminal of the transistor of the photocoupler 16b11 is connected to ground, while the anode side of associated diode is connected to a 5 V operating power source and the cathode side to the collector terminal of a transistor 16b12. The emitter terminal of the transistor 16b12 is connected to ground and the base terminal to the (first) output port 16a3 of the CPU 16a.

In the second and third instruction sections 16b2, 16b3, the signal line 16b4 connected with the REM+ terminal is branched off at branch points and connected to the anode sides of diodes of photocouplers 16b21, 16b31. The cathode sides of the diodes are connected via the diodes and terminals 26b, 26a to the terminals 102 connected with the PL terminals of the second generator B and first generator A.

The collector terminals of transistors of the photocouplers 16b21, 16b31 are connected to 5 V operating power sources and to input ports 16a1, 16a2 of the CPU 16a, while the emitter terminals are connected to ground.

In the second and third instruction sections 16b2, 16b3, the branches of the signal line 16b4 are connected to the REM+ terminals of the generators B. A through diodes 16b22, 16b32 and the terminals 26b, 26a, and then to the ECUs 110b, 110a.

The signal line 16b5 (connected with the stop terminal) is connected to the terminals 106 of the generators B, A through diodes 16b23, 16b33 and the terminals 26b, 26a, and then to the ECUs 110b, 110a.

The signal line 16b6 (connected with the start terminal) is connected to the ECU 110b through the terminal 104b of the generator B via a diode 16b24 and the terminal 26b, and connected to the ECU 110a through the terminal 104a of the generator A via the collector/emitter terminal of a transistor of a photocoupler 16b25, a diode 16b34 and the terminal 26a.

The anode side of the diode of the photocoupler 16b25 is connected to a 5 V operating power source and the cathode side to the collector terminal of a transistor 16b26. The base terminal of the transistor 16b26 is connected to the (second) output port 16a4 of the CPU 16a.

The relay driver 16c is equipped with an FET 16c1. The gate of the FET 16c1 is connected to the output port 16a5 of the CPU 16a, the source is connected through a control coil 16c2 to a 12 V power source in the operating power circuit, and the drain is connected to ground.

When a negative voltage is outputted from the output port 16a5 of the CPU 16a, the FET 16c1 does not conduct and the control coil 16c2 is therefore demagnetized. As a result, a contact 16c3 remains closed so that the coil 18a1 connected to the high voltage wire 14a1 and neutral wire 14a3 is also demagnetized. Since the four contacts 18a2 therefore remain closed (relay OFF), the generators A and B remain connected to the electrical load 12 through the conductive path 14.

When a positive voltage is outputted from the output port 16a5 of the CPU 16a, the FET 16c1 conducts to magnetize the control coil 16c2 and coil 18a1. Since the four contacts 18a2 are therefore opened (relay ON), the generators A and B are prevented from connecting to the electrical load 12. When disconnection of a plug has been detected in a suitable manner, the CPU16a of the ECU 16 outputs a positive voltage from the output port 16a4 to open the switching circuit 18.

Figure 3:
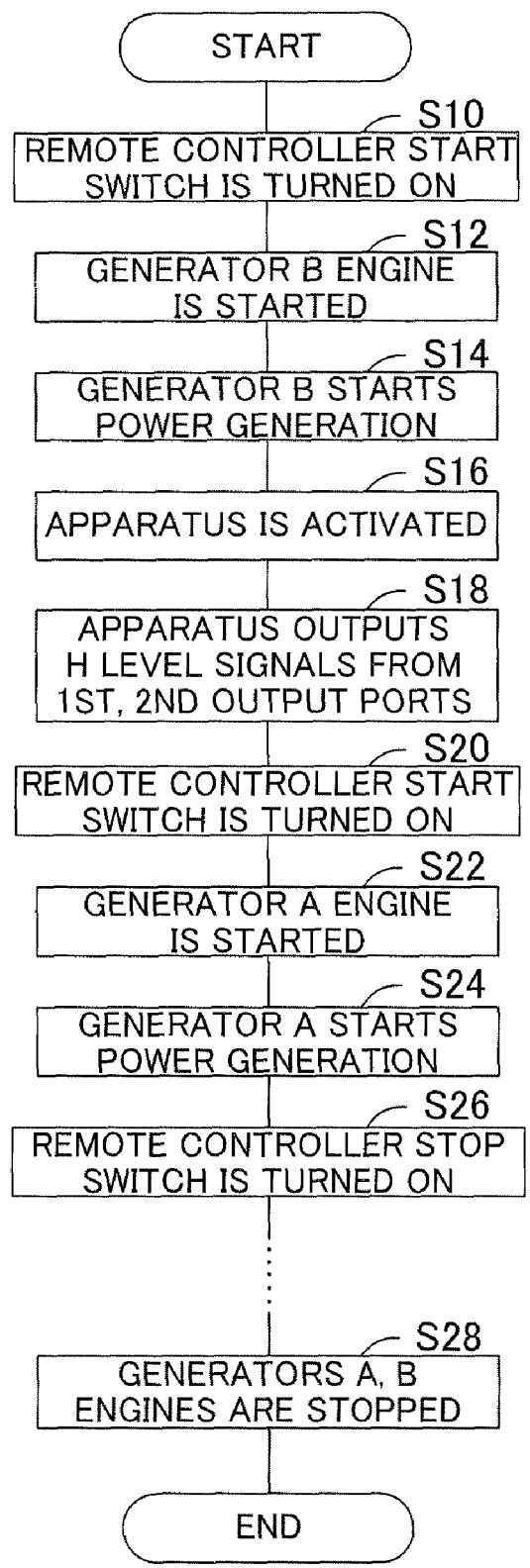
FIG. 3 is a flowchart showing the sequence of operations of the ECU shown in FIG. 2.
Figure 4:
FIG. 4 is a time chart for explaining the operations of FIG. 3.
Figure 4:
Figure 4:
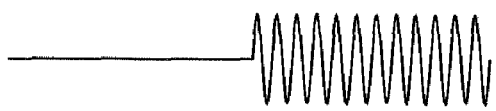
Figure 4:
Figure 4:
Figure 4:
Figure 4:
Figure 4:
Figure 4:
Figure 4:

FIG. 3 is a flowchart showing the sequence of operations of the apparatus 10 and FIG. 4 is a time chart for explaining the operations.

When the start switch 200a is turned ON (manipulated) by the user (S10), a signal indicating the manipulation is transmitted to the ECU 110b of the generator B through the signal line 16b6, diode 26b24 and the like.

In response thereto, the ECU 110b starts the engine to activate the generator B (S12) to start generating power (S14). As a result, the apparatus 10 is energized and activated by the generator B (S16).

When the generators A, B are run in parallel, they are started not simultaneously but sequentially because one of the generators A, B, which is started later, is needed to be controlled so that a phase of the output of the one becomes identical with that of the other of the generators which is started first. Therefore, in FIG. 3, the generator B is defined as the generator to be started first.

Upon activation, the apparatus 10 recognizes that the generator B has been started to generate power, outputs a signal of H level from the first output port 16a3 and conducts the photocoupler 16b11 to light the lamp 200c of the controller 200, while outputting a signal of H level from the second output port 16a4 and conducts the transistor of the photocoupler 16b25 (S18).

When the start switch 200a is turned ON (manipulated) by the user again (S20), a signal indicating the manipulation is transmitted to the ECU 110a of the generator A through the signal line 16b6, transistor of the photocoupler 16b25, diode 26b34 and the like.

In response thereto, the ECU 110a starts the engine (S22) to start generating power (S24). Thus the two generators A, B are run in parallel by using a single remote controller 200.

Next, when the stop switch 200b is turned ON (manipulated) by the user (S26), a signal indicating the manipulation is transmitted to the ECUs 110b, 110a of the generators B, A through the signal line 16b5, diodes 16b23, 16b33 and the like. In response thereto, the ECUs 110b, 110a stop the engines (S28). In the stop operation, since it is not necessary to make the phases identical, the two generators A, B are stopped simultaneously.

As stated above, the embodiment is configured to have an apparatus (10) for connecting generators (A, B) to an electrical load (12) through a conductive path (14) to run in parallel, comprising: a first group of terminals (22) that are adapted to be connected to a single remote controller (200) provided independently and separately from the apparatus and provided with a start switch (200a) and a stop switch (200b) to be manipulated by an operator; a second group of terminals (26) that are adapted to be connected to each remote control terminal (100, 102, 104, 106) of the generators; and an electronic control unit (16) that is connected to the first and second group of terminals and starts/stops each of the generators by outputting signals to each of the generators through the second group of terminals in accordance with a start instruction signal and a stop instruction signal produced in response to the operator's manipulation of the start switch and stop switch and inputted through the first group of terminals (S10 to s28).

In the apparatus, each of the generators has a generator controller (electronic control unit 110a, 110b) and the start instruction signal of one of the generators is directly outputted to the generator controller concerned to start the one of the generators, and the electronic control unit (16) is activated to output the start instruction signal to other generator controller in response to the next operator's manipulation of the start switch (S10 to S18).

In the apparatus, the single remote controller (200) is provided with a lamp (200c), and the electronic control unit lights the lamp when the one of the generators is started (S16, S18).

In the apparatus, the generators (A, B) are two.

With this, it becomes possible to start and stop a plurality of the generators A, B by using the single remote controller 200. Further, since the single controller 200 is shared or used in common, the structure can be simple.

Furthermore, a plurality of the generators A, B can be started and stopped by manipulating the single controller 200, thereby facilitating remote control and improving convenience.

It should be noted that, in the foregoing embodiment, although the explanation is made on the case where the two generators A, B are run in parallel, this invention can be applied to the parallel running of three or more interconnected generators.

Japanese Patent Application No. 2008-164372 filed on Jun. 24, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for connecting two generators to an electrical load through conductive paths running in parallel, comprising:
    a single remote controller provided independently and separately from the apparatus, the remote controller including a start switch and a stop switch that are manipulated by an operator;
    a first group of terminals that is connected to the remote controller;
    a second group of terminals that is connected to each remote control terminal of the generators;
    an electronic control unit that is connected to the first and second group of terminals and starts/stops each of the generators by outputting signals to each of the generators through the second group of terminals in accordance with a start instruction signal and a stop instruction signal produced in response to the operator's manipulation of the start switch and stop switch and inputted through the first group of terminals; and
    a relay driver which drives a switching circuit that connects the first generator and the second generator to a load;
    wherein the electronic control unit further comprises:
        a first instruction section connected with the remote controller via the first group of terminals,
        a second instruction section connected with the first generator via the second group of terminals,
        a third instruction section connected with the second generator via the second group of terminals, and a photocoupler interposed between the second and third instruction sections;

the first generator has a first generator controller and the second generator has a second generator controller;

the first instruction section instructs the relay driver to drive the switching circuit in response to the operator's manipulation of the remote controller;

the second instruction section instructs the first generator controller to start the first generator and conducts the photocoupler to electrically connect the second and third instruction sections when a first instruction signal produced in response to the operator's manipulation of the start switch is sent from the remote controller through the first instruction section; and the third instruction section instructs the second generator controller to start the second generator when a second start instruction signal produced in response to a next operator's manipulation of the start switch is sent from the remote controller through the first instruction section and the conducted photocoupler.

2. The apparatus according to claim 1, wherein the single remote controller is provided with a lamp, and the electronic control unit lights the lamp when the one of the generators is started.

3. The apparatus according to claim 1, wherein the relay driver comprises an FET.

4. The apparatus according to claim 3, wherein when a negative voltage is output from the electronic control unit, the FET is OFF, a control coil of the relay driver is demagnetized and the generators remain connected to the load through the conductive paths.

5. The apparatus according to claim 3, wherein when a positive voltage is output from the electronic control unit, the FET conducts, a control coil of the relay driver is magnetized and the generators are disconnected from the load through the conductive paths.

* * * * *